United States Patent Office 3,229,372
Patented Jan. 18, 1966

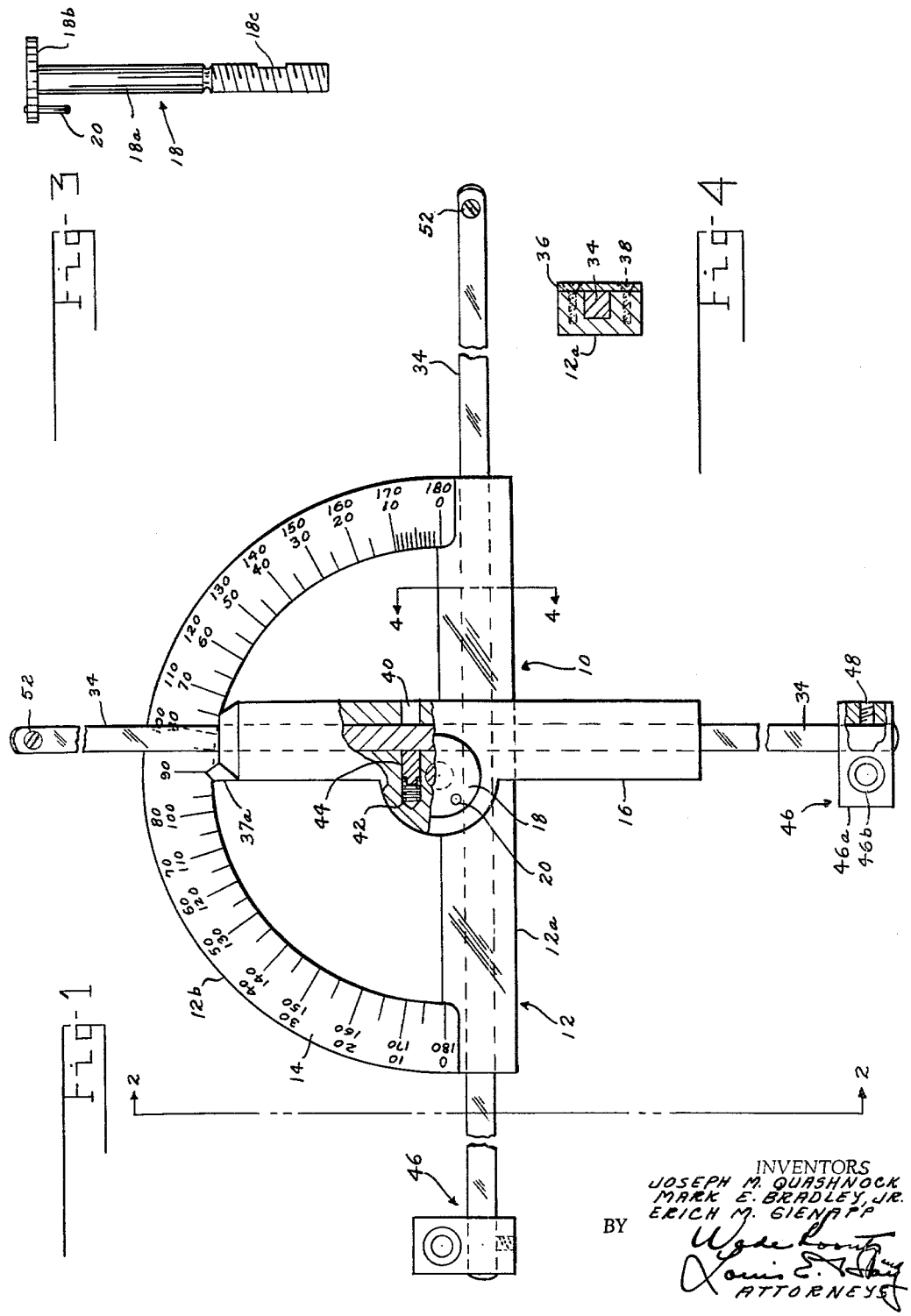

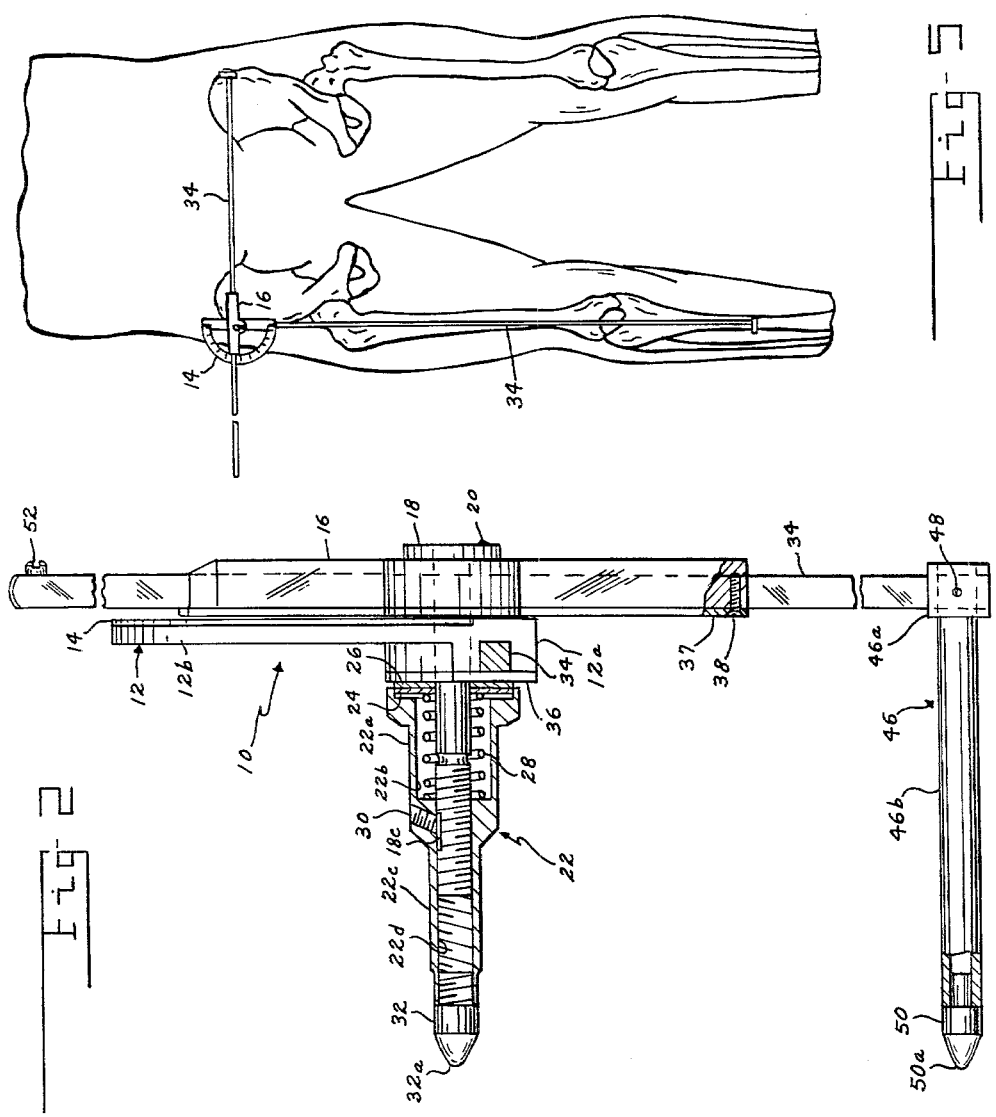

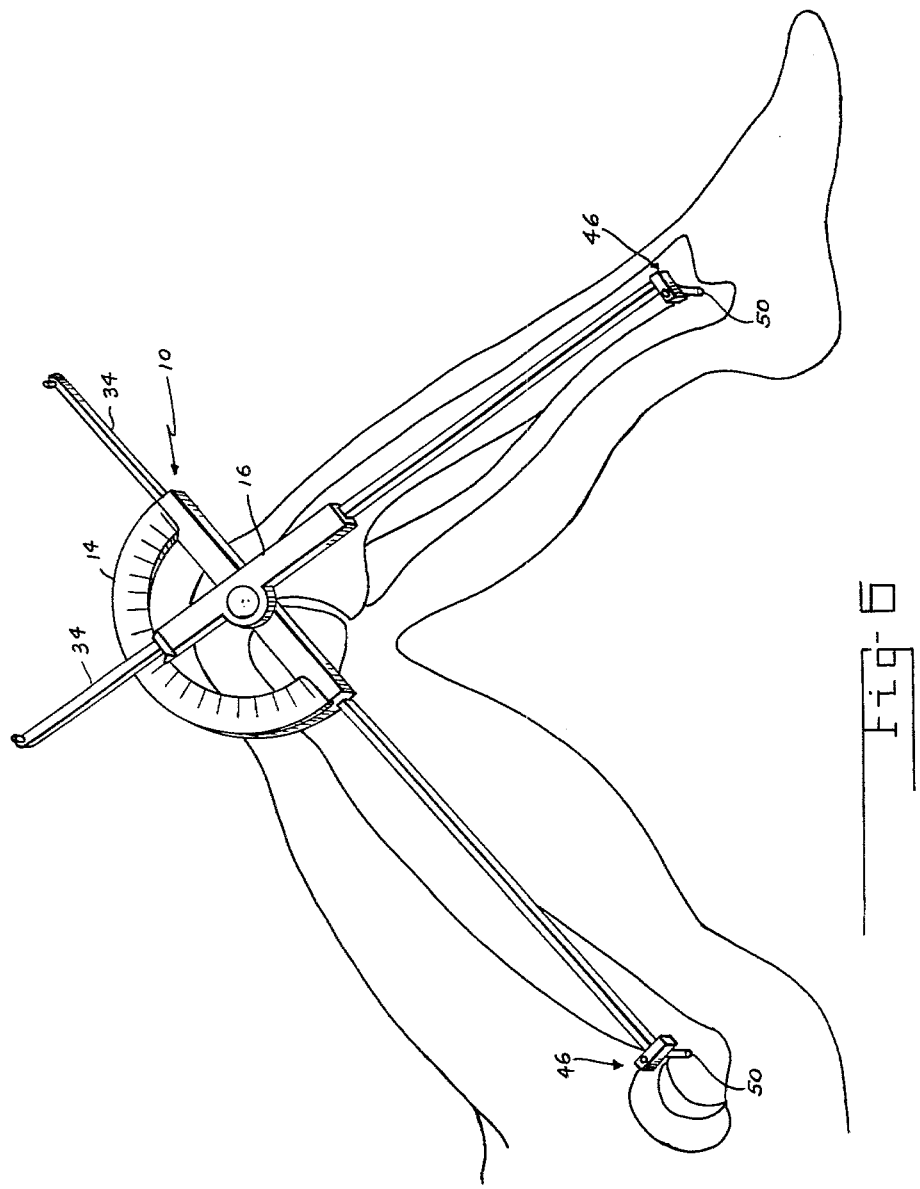

3,229,372
GONIOMETER
Joseph M. Quashnock, 5746 Access Road, Dayton, Ohio;
Mark E. Bradley, Jr., 531 1st St., Wright-Patterson
AFB, Ohio; and Erich M. Gienapp, 418 N. Park Place,
Yellow Springs, Ohio
Filed Jan. 23, 1964, Ser. No. 339,830
3 Claims. (Cl. 33—75)
(Granted under Title 35, U.S. Code (1952), sec. 266)

The invention described herein may be manufactured and used by or for the Government for governmental purposes without the payment to us of any royalty thereon.

This invention relates to devices for the measurement of angles; the angle being read on a protractor scale. More specifically, this invention relates to angle measuring devices adapted for measuring angular movements of portions of the human anatomy, such as joints between bones. Although there are other suggested uses for the device, such as with animals, the following disclosure and illustrated uses will be limited to the human anatomy.

There are numerous instances in the practice of medicine, treatment of accident patients, and in post-surgical care where it is very desirable and beneficial to accurately measure the relative movement of a portion of a patient's anatomy. For example: a patient may have sustained a severe knee injury in an automobile accident; with the result that his knee action is impaired for a sustained period of time during which he is deprived of the normal flexure of the knee joint. In the course of medical care, a series of angular measurements indicating the amount of flexure attainable by the patient will indicate both his progress and his degree of recovery.

Another example where the device of this invention will be extremely useful is with arthritic patients, where it is desirable to chart the course of the disease in relation to the limitation of normal joint flexure.

The device of this invention is useful for measuring most body movements, including that of the spine. As will be apparent to those in the medical art, the device is based on a new position fixing concept; one which has not been used by currently available measuring devices.

Heretofore, goniometers have been placed on the body of the patient by rough surface approximation for bringing the arms of the device into linear alignment with appropriate bones. Unfortunately, the past devices cannot be repeatedly aligned to the same position; likewise, there will be a personnel variance between users. This may result in inconsistent readings as high as 10°, and often will indicate a change in the wrong direction. For example: the patient may actually have made a 5° improvement, but the 10° error may indicate an apparent retrogression.

The device of this invention uses the new concept of utilizing known points on various bones of the body as landmarks on which to locate the goniometer for consistency of repeated readings, and for the elimination of personnel variations.

One object of the present invention is to provide a goniometer having optimum accuracy and consistency between readings.

Another object of the present invention is to provide a goniometer having locating points for locating at known landmarks on bones of the human body.

A further object of the present invention is to provide a goniometer on which the locating points are extendably adjustable in relation to the pivot axis in order that the device is equally adaptable to all body sizes ranging from a child to an adult.

Yet another object of the present invention is to provide a goniometer capable of measuring unusual motions such as the adduction and abduction of the leg about the hip socket.

Additional objects, advantages and features of the invention reside in the construction, arrangement and combination of parts involved in the embodiment of the invention as will appear from the following description and accompanying drawings, wherein:

FIG. 1 is a plan view of the goniometer, partially broken to show construction details, FIG. 2 is an elevation along line 2—2 on FIG. 1, partially in section to show construction details, FIG. 3 is a detail of the pivot pin, FIG. 4 is an end section through line 4—4 on FIG. 1, FIG. 5 shows the goniometer in proper position for checking the adduction and abduction of the leg, with the locating points of the device located at the two anterior superior iliac spines of the pelvis and the third locating point below the knee on the line of the prominent anterior border of the tibia (shin), and FIG. 6 is a perspective view of the goniometer when checking the flexure of a knee joint and showing the locating points of the goniometer located at the appropriate landmarks of the leg bones.

Referring to FIG. 1 and FIG. 2, the goniometer, referred to in its entirety as goniometer 10, has a protractor head 12 having an elongated base member 12a and an arcuate semicircular sector 12b. The ends of the arcuate sector are laterally joined to the side of the base member. Scribed directly thereon, or joined to the upper face of the arcuate sector, is an arcuate angle indicating protractor scale 14. As best shown on FIG. 1, the protractor scale is scribed to indicate degrees and is double numbered as shown, in order to be progressively readable in both directions.

An elongated pointer head 16 is superimposed in pivotal relationship with the protractor head 12. The pointer head 16 and protractor head 12 are joined by pivot means comprising a pivot pin 18 and a pivot housing 22. The pivot pin 18 passes through the protractor head at that point on base member 12a which is the geometric center of the protractor scale 14.

Longitudinally sliding through and outwardly extending from both the protractor head 12 and the pointer head 16, so as to be substantially normal to the pivot axis, is an arm 34, which may conveniently be of square cross section to prevent rotation. FIG. 4 is typical, not only of the construction in regard to the protractor head 12, but also of the construction in regard to the pointer head 16. Each arm 34 is axially slidable in an elongated open slot milled into the lower face of the base member 12a of the protractor head as shown on FIG. 4, and in a similar slot milled into the lower face of the pointer head 16. The slots are conveniently made in rectangular form for receiving the square arms 34 which are nonrotating in the slots. The slot in the protractor head is milled to be parallel to the chord between the ends of the protractor scale and as near as is practical to the geometric center of the protractor scale. The slot in the pointer head is milled to be longitudinal and as near as is practical to the pivot pin 18 passing therethrough. The open slot in the protractor head is covered, as shown on FIG. 4, with a first elongated cover plate 36 retained by screws 38, to form an elongated open ended passage in which the arm 34 is slidably retained. The open slot in the pointer head is similarly covered with a second elongated cover plate 37. Extending from the end of the cover plate 37 is a pointer 37a which communicates with the scale on the protractor head to indicate the angular reading between the arms 34. The pointer is so located on the cover plate 37 that the extended axis of the pointer will pass through the axis of the pivot means.

Referring to FIG. 3, the pivot pin 18 has an elongated stem 18a extending from head 18b. The end of stem 18a is externally threaded and is provided with a screw flat 18c. Extending from the head of the pivot pin, so as to be adjacent to and parallel with the elongated stem, is a locator pin 20. When the pivot pin is assembled with the pointer head 16 and the protractor head 12, as best shown on FIG. 2, the locator pin 20 engages a mating hole in the upper face of the pointer head, to thus prevent rotation of the pointer head on the pivot pin. Since the pivot pin 18 is thus nonrotatably joined to the pointer head, the relative rotation between the pointer head and the protractor head will be with the protractor head rotating on the pivot pin.

Again referring to FIG. 2 the elongated stem of the pivot pin 18, which extends through the bottom face of the cover plate 36 on the protractor head 12, is in threaded engagement with pivot housing 22. The pivot housing 22 consists, in its more essential elements, of a circular housing portion 22a having an open end cavity 22b, and a reduced diameter stem portion 22c having an internal thread 22d which is coaxial with the open end cavity 22b. The open cavity end of the pivot housing is counterbored for receiving washers 24 and 26. Washer 26, which is adjacent to the bottom face of cover plate 36, is preferably made of phenolic or other material which will not scar a metallic surface. Washer 24 may be made of steel or other metallic material. Washers 24 and 26 are not absolutely essential; however, the device will function more smoothly with the washers.

Coaxially surrounding the stem portion of pivot pin 18 and nested within cavity 22b of the pivot housing 22, so as to be disposed between the bottom of the cavity and washer 24, is a biasing means such as compression spring 28. The compression spring biases the protractor head against the pointer head and offers resistance to the free relative rotation between the protractor head and the pointer head. The pivot pin 18 is retained in threaded engagement with the pivot housing 22 by means of set screw 30 which threadably engages the pivot housing and locks against the screw flat 18c as shown on FIG. 2 and FIG. 3.

Joined to the end of the stem portion 22c of the pivot housing 22, so as to be coaxial with the axis of the pivot pin 18, is a first locating point 32 having a spherical tip 32a. The locating point is preferably made of nylon or other relatively soft material and may be provided with a threaded shank for engaging the threaded end of the pivot housing as shown.

Friction devices may readily be incorporated to prevent the free longitudinal movement of the arms 34. Such a device may consist of a spring actuated pressure exerting structure acting laterally between the arm and the adjacent structure of the protractor head or the pointer head. For the sake of clarity and brevity, only the friction device used with the arm passing through the pointer head 16 is shown on the drawings; the device shown being identical with the friction device used on the arm passing through the protractor head 12.

Referring to FIG. 1, a hole 40 is transversely drilled to intersect the elongated open slot carrying the arm 34 and bottoming-out in the hub portion of the pointer head 16 through which the pivot pin 18 passes. A compression spring 42 is dropped into the hole; followed by a circular plug 44 which is axially slidable in hole 40. Assembly is made by depressing the plug 44 against the spring with a hand tool, such as a punch, while the arm 34 is inserted into the longitudinal slot.

Removably joined to the extending end of each arm 34 is a point supporter 46 which is retained in position by means of set screw 48. It is noted that the point supporter may be locked in place on the arm; or, if desired, it may be adjustable on the arm, in which case, for convenience, the set screw 48 could be replaced with a wing screw or one having a knurled head for easy hand manipulation. The point supporter 46 consists of a block 46a having a first passage for engaging arm 34 and a second passage normal to the first passage for engaging tube 46b. Joined to the end of each point support 46 is a locating point 50 having a spherical tip 50a. Each point is preferably made of nylon or other relatively soft material and may be provided with a shank for an interference fit with tube 46b of the point supporter 46. The point supporters with attached locating points extend in the direction of and are substantially parallel with the axis of the pivot means and locating point 32. The opposite end of each arm 34 is provided with a screw 52 or other means for preventing the accidental removal of the arm, while at the same time providing means permitting the deliberate removal, as when for example, arms of a different length are to be substituted.

The use of the goniometer is well illustrated by FIG. 6. Locating point 32 (not shown in this figure) is placed at the line of articulation between the lower end of the femur and the upper end of the tibia, on the axis of flexion. One of the locating points 50 is placed on the prominence of the lateral malleolus at the lower extremity of the fibula (usually referred to as the protuberance of the ankle) and the other locating point 50 is placed on the line of the lateral ridge of the femur near the greater trochanter. When the lower leg is moved from one extreme position to the other with the locating points retained at their initial positions, the total angular movement may easily be read on the protractor scale.

FIG. 5 illustrates the use of the goniometer on an application which is unique to previous devices commercially available from medical and hospital supply houses. The locating point 32 at the end of the pivot means of the device is placed at one of the anterior superior iliac spines of the pelvis and the locating point at the end of the arm passing through the pointer head is placed at the opposite spine. The locating point at the end of the arm passing through the protractor head is placed at a point below the knee on the line of the prominent anterior border of the tibia (shin). When located on the body as shown, the goniometer will measure both the adduction and abduction of the leg as one continuous angular movement. The goniometer which comprises this invention is the only known instrument which will continue with its intended measuring function as one leg is crossed over the other leg.

It is to be understood that the embodiment of the present invention as shown and described is to be regarded as illustrative only, and that the invention is susceptible to variations, modifications and changes within the scope of the appended claims.

We claim:

1. A goniometer for measuring angular movement of joints between bones in a human body and comprising: a protractor head having an arcuate sector with an angle indicating scale on the upper face thereof and having the ends of the sector laterally joined to an elongated base member having an open slot in the lower face thereof substantially parallel with a chord through the ends of the scale, a first elongated cover plate joined to the lower face of the elongated base member of said protractor head and covering the open slot to form an elongated open ended passage in said protractor head, an elongated pointer head in superimposed relationship with said protractor head and having an open slot extending longitudinally in the lower face of said pointer head, a second elongated cover plate joined to the lower face of said pointer head and covering the open slot to form an elongated open ended passage in said pointer head, said second elongated cover plate having a pointer means extending from one end for indicating a position on the scale of said protractor head, pivot means pivotally joining said pointer head and said protractor head by passing through said pointer head and said second elongated cover plate on the extended longitudinal axis of the pointer on said second elongated cover plate and through the said protractor head and said first cover plate on the geometric center of the arcuate scale on said protractor head, said pivot means comprising a pivot pin passing through said pointer head and said second elongated cover plate and through said protractor head and said first elongated cover plate and having an externally threaded end extending from the lower face of said first elongated cover plate, and a pivot housing having an axial internal thread engaging the threaded end of said pivot pin and further having a coaxial open end cavity the open end of which is proximate the lower face of said first elongated cover plate; a biasing means comprising a compression spring coaxially surrounding said pivot pin and nesting within the open end cavity in said pivot housing to axially bias together said protractor head and said pointer head and to frictionally resist relative angular movement between said protractor head and said pointer head on said pivot means, a first arm slidably extending from the elongated open ended passage in said protractor head, a second arm slidably extending from the elongated open ended passage in said pointer head, a first spring actuated pressure exerting means acting laterally between the elongated base member of said protractor head and said first arm to frictionally resist the sliding movement of said first arm, a second spring actuated pressure exerting means acting laterally between said elongated pointer head and said second arm to frictionally resist the sliding movement of said second arm, a first locating point coaxially joined to the extending end of said pivot means, a second locating point joined to the said first arm, a third locating point joined to said second arm, said second and said third locating points extending in the direction of and substantially parallel with said pivot means and said first locating point, the pointer on said second elongated cover plate indicating on the scale of said protractor head the angular relationship between said arms when said locating points are placed and retained during body movement on bony landmarks of the human body.

2. A goniometer for measuring angular movement of joints between bones in a human body and comprising: a protractor head having an arcuate angle indicating scale thereon, a pointer head in superimposed relationship with said protractor head and having pointer means joined thereto for indicating a position on the scale of said protractor head, pivot means pivotally joining said protractor head and said pointer head at the geometric center of the arcuate scale on said protractor head and extending therefrom, said pivot means comprising a pivot pin passing through said pointer head and said protractor head and having an externally threaded end extending from a lower face of said protractor head, and a pivot housing having an axial internal thread engaging the threaded end of said pivot pin and further having a coaxial open end cavity the open end of which is proximate said protractor head; biasing means engaging said pivot means to axially bias together said protractor head and said pointer head and to frictionally resist relative angular movement between said protractor head and said pointer head on said pivot means, said biasing means being a compression spring coaxially surrounding said pivot pin and nesting within the open end cavity in said pivot housing; a first arm slidably extending from said protractor head to be substantially normal with the axis of said pivot means, a second arm slidably extending from said pointer head to be substantially normal with the axis of said pivot means, a first pressure exerting means acting between said protractor head and said first arm to frictionally resist the sliding movement of said first arm, a second pressure exerting means acting between said pointer head and said second arm to frictionally resist the sliding movement of said second arm, a first locating point coaxially joined to the extending end of said pivot means, a second locating point joined to said first arm, a third locating point joined to said second arm, said second and said third locating points extending in the direction of and substantially parallel with said pivot means and said first locating point, the pointer on said pointer head indicating on the scale of said protractor head the angular relationship between the said arms when said locating points are placed and retained during body movement on bony landmarks of the human body.

3. A goniometer for measuring angular movement of joints between bones in a human body and comprising: a protractor head having an arcuate sector with an angle indicating scale thereon and having the ends of the sector laterally joined to an elongated base member, an elongated pointer head in superimposed relationship with said protractor head and having a pointer means extending from one end thereof for indicating a position on the scale of said protractor head, pivot means pivotally joining said protractor head and said pointer head at the geometric center of the arcuate scale on said protractor head and extending therefrom, said pivot means comprising a pivot pin passing through said pointer head and said protractor head and having an externally threaded end extending from a lower face of said protractor head, and a pivot housing having an axial internal thread engaging the threaded end of said pivot pin and further having a coaxial open end cavity the open end of which is proximate said protractor head; spring biasing means engaging said pivot means to axially bias together said protractor head and said pointer head and to frictionally resist relative angular movement between said protractor head and said pointer head on said pivot means, said spring biasing means being a compression spring coaxially surrounding said pivot pin and nesting within the open end cavity in said pivot housing; a first arm slidably extending from the base member of said protractor head substantially parallel with a chord through the ends of the scale and substantially normal with the axis of said pivot means, a second arm slidably extending from said pointer head substantially parallel with the axis of the pointer means and substantially normal with the axis of said pivot means, a first spring actuated pressure exerting means acting laterally between the elongated base member of said protractor head and said first arm to frictionally resist the sliding movement of said first arm, a second spring actuated pressure exerting means acting laterally between said elongated pointer head and said second arm to frictionally resist the sliding movement of said second arm, a first locating point coaxially joined to the extending end of said pivot means, a second locating point joined to said first arm, a third locating point joined to said second arm, said second and said third locating points extending in the direction of and substantially parallel with said pivot means and said first locating point, the pointer on said pointer head indicating on the scale of said protractor head the angular relationship between the said arms when said locating points are placed and retained during body movement on bony landmarks of the human body.

References Cited by the Examiner

UNITED STATES PATENTS

| 1,161,504 | 11/1915 | Miller | 33—143 X |
| 1,590,499 | 6/1926 | Cozad | 33—174 X |
| 2,735,185 | 2/1956 | Naphtal | 33—120 |
| 3,065,546 | 11/1962 | Brocklander | 33—75 |
| 3,094,787 | 6/1963 | Moore | 33—161 |

FOREIGN PATENTS

| 21,810 | 5/1957 | Germany. |
| 22,315 | 1900 | Great Britain. |
| 118,079 | 2/1947 | Sweden. |

ISAAC LISANN, *Primary Examiner.*

H. N. HAROIAN, *Assistant Examiner.*